United States Patent
Hokuto (10) Patent No.: US 7,377,248 B2
(45) Date of Patent: May 27, 2008

(54) ENGINE STARTING CONTROL SYSTEM OF INTERNAL COMBUSTION ENGINE

(75) Inventor: Hiroyuki Hokuto, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 87 days.

(21) Appl. No.: 10/578,667

(22) PCT Filed: Jun. 20, 2005

(86) PCT No.: PCT/JP2005/011686

§ 371 (c)(1),
(2), (4) Date: May 9, 2006

(87) PCT Pub. No.: WO2005/124129

PCT Pub. Date: Dec. 29, 2005

(65) Prior Publication Data

US 2007/0131188 A1 Jun. 14, 2007

(30) Foreign Application Priority Data

Jun. 21, 2004 (JP) .............................. 2004-182783

(51) Int. Cl.
*F02N 17/00* (2006.01)
*F02B 7/00* (2006.01)
(52) U.S. Cl. .................................... 123/179.4; 123/431
(58) Field of Classification Search ............. 123/179.4, 123/431; 701/112, 113
See application file for complete search history.

(56) References Cited

U.S. PATENT DOCUMENTS

| 5,924,405 | A | | 7/1999 | Hashimoto | |
|---|---|---|---|---|---|
| 6,050,232 | A | | 4/2000 | Grob et al. | |
| 6,098,585 | A | * | 8/2000 | Brehob et al. | ............ 123/179.5 |
| 6,218,799 | B1 | * | 4/2001 | Hori | ............................ 318/446 |
| 6,499,342 | B1 | * | 12/2002 | Gonzales, Jr. | ............. 73/117.3 |
| 6,681,173 | B2 | * | 1/2004 | Turner et al. | ................ 701/113 |
| 6,718,928 | B2 | | 4/2004 | Brueggen et al. | |
| 6,910,457 | B2 | | 6/2005 | Grieser et al. | |
| 6,959,693 | B2 | * | 11/2005 | Oda | ............................ 123/431 |
| 7,027,911 | B2 | * | 4/2006 | Nishikawa et al. | ......... 701/112 |
| 7,028,656 | B2 | * | 4/2006 | Tsuji et al. | ............ 123/179.16 |
| 7,104,255 | B2 | * | 9/2006 | Hashima et al. | ............ 123/431 |

(Continued)

FOREIGN PATENT DOCUMENTS

DE 195 27 503 A1 1/1997

(Continued)

*Primary Examiner*—Stephen K. Cronin
*Assistant Examiner*—Arnold Castro
(74) *Attorney, Agent, or Firm*—Oliff & Berridge, PLC (57) ABSTRACT

In an engine starting control system of an internal combustion engine in which an eco-run control is performed, a combustion stroke that each cylinder reaches when the internal combustion engine comes to an engine stopped state by the eco-run control is predicted, and in an expansion stroke cylinder that the predicted combustion stroke is an expansion stroke, fuel of a predetermined amount is injected from an intake passage injection valve into an intake passage just before the internal combustion engine comes to an engine stopped state, and in the expansion stroke cylinder, an engine start of the internal combustion engine in an engine stopped state is performed by injecting fuel from the cylinder injection valve into the cylinder and igniting the air-fuel mixture in the cylinder by an ignition plug.

10 Claims, 5 Drawing Sheets

U.S. PATENT DOCUMENTS

| | | | |
|---|---|---|---|
| 7,198,031 B2* | 4/2007 | Saito et al. | 123/431 |
| 7,269,499 B2* | 9/2007 | Murakami et al. | 701/112 |
| 2002/0157630 A1 | 10/2002 | Gerhard et al. | |
| 2004/0123831 A1 | 7/2004 | Grieser et al. | |
| 2004/0214689 A1* | 10/2004 | Kaneko | 477/203 |

FOREIGN PATENT DOCUMENTS

| | | |
|---|---|---|
| EP | 1 413 727 A1 | 4/2004 |
| JP | U 60-128975 | 8/1985 |
| JP | A 10-047104 | 2/1998 |
| JP | A 10-176574 | 6/1998 |
| JP | A 11-159374 | 6/1999 |
| JP | A 2001-336439 | 12/2001 |
| JP | A 2001-342876 | 12/2001 |
| JP | A 2002-004985 | 1/2002 |
| JP | A 2002-039038 | 2/2002 |
| JP | A 2002-317740 | 10/2002 |
| JP | A 2004-036561 | 2/2004 |
| JP | A 2004-332599 | 11/2004 |
| WO | WO 01/81760 A1 | 11/2001 |

* cited by examiner

ENGINE STARTING CONTROL SYSTEM OF INTERNAL COMBUSTION ENGINE

TECHNICAL FIELD

The present invention relates to an engine starting control system for controlling an engine start of an internal combustion engine.

BACKGROUND ART

In an internal combustion engine for an automobile, there is performed a control of the internal combustion engine in which the internal combustion engine is stopped automatically when the automobile decelerates or stops to improve the fuel consumption or the like, and when a starting operation such as pressing the accelerator pedal is performed, the internal combustion engine starts automatically, that is, a so-called economy running control (hereinafter referred to as "eco-run control") (see, for example, Japanese Patent Laying-Open No. 10-47104).

When an engine start is performed in the internal combustion engine in which the eco-run control is performed, if a crankshaft is rotated at a predetermined position by a starter motor and fuel injection is performed in a specific cylinder so as to start the engine with combustion torque of the cylinder, a time period required for the engine start becomes longer, which makes a rapid engine start difficult.

In view of the above, there is disclosed a technique for shortening the time required for an engine start by detecting a cylinder in an expansion stroke when the engine is in a stopped state by the eco-run control, and when the engine starts, fuel is injected into the cylinder directly so as to generate combustion torque (see, for example, Japanese Patent Laying-Open No. 2001-342876).

When an internal combustion engine stopped by the eco-run control is caused to start, it is possible to perform an engine start by injecting fuel directly into a cylinder reaching an expansion stroke at the time of engine stop and using the combustion torque generated by the combustion of the fuel. However, the internal combustion engine is in an engine stopped state at the time of injecting the fuel, so there is no disturbance caused by the air current inside the cylinder, whereby the injected fuel is less likely to be diffused uniformly within the cylinder. Accordingly, there may be a case where too dense portions are caused locally in the air-fuel mixture prepared in the cylinder, causing an increase in unburned fuel components, and worsening of emission such as generation of black smoke.

DISCLOSURE OF THE INVENTION

In view of the aforementioned problems, an object of the present invention is to provide an engine starting control system of an internal combustion engine capable of, in an internal combustion engine where an eco-run control is performed, realizing a rapid engine start and suppressing worsening of emission at the time of engine start.

In order to solve the aforementioned problems, the present invention first focuses attention on, in an internal combustion engine in which an eco-run control is performed, fuel injection in a cylinder reaching an expansion stroke when the internal combustion engine comes to an engine stopped state. If fuel injection is performed in the cylinder just before the engine stop, the engine is stopped in a state where the fuel has been supplied in the cylinder. Consequently, diffusion and uniformity of the fuel is facilitated inside the cylinder. Then, at the time of starting, the fuel inside the cylinder is burned so that combustion torque is generated, which enables both rapid engine start and suppression of worsening of emission.

Thus, the present invention provides an engine starting control system of an internal combustion engine including: a plurality of cylinders, each of which has an intake passage injection valve for injecting fuel into an intake passage, a cylinder injection valve for injecting fuel into a cylinder, and an ignition plug for igniting an air-fuel mixture in a cylinder; and an engine stopping unit to perform an engine stop of the internal combustion engine when a predetermined condition is satisfied in an operating state of the internal combustion engine. The system includes: a combustion stroke prediction unit to predict a combustion stroke that a cylinder of the internal combustion engine reaches when the internal combustion engine comes to an engine stopped state by the engine stopping unit; a preliminary fuel injection unit to inject fuel of a predetermined amount from the intake passage injection valve into the intake passage just before the internal combustion engine is stopped by the engine stopping unit, in an expansion stroke cylinder in which a combustion stroke predicted by the combustion stroke prediction unit is an expansion stroke; and an engine starting unit to perform, in the expansion stroke cylinder, an engine start of the internal combustion engine in an engine stopped state by injecting fuel from the cylinder injection valve into the cylinder and igniting an air-fuel mixture in the cylinder by the ignition plug.

In the internal combustion engine, a so-called eco-run control is performed by an engine stop by the engine stopping unit and by starting the internal combustion engine in an engine stopped state. In the eco-run control, the internal combustion engine is in an engine stopped state when the aforementioned predetermined condition is satisfied. The predetermined condition is a condition of an operating state that combustion torque exhibited by the internal combustion engine is not required such as a case where traveling of a vehicle mounting the internal combustion engine is stopped, or a case where deceleration operation is performed.

In the internal combustion engine in which the eco-run control is performed, a combustion stroke that each cylinder reaches, when the internal combustion engine comes to an engine stopped state, is predicted by the combustion stroke prediction unit. For example, if the internal combustion engine is a 4-cycle engine, it is predicted by the combustion stroke prediction unit that which one of an intake stroke, a compression stroke, an expansion stroke and an exhaust stroke each cylinder reaches at the time of engine stop.

A combustion stroke predicted by the combustion stroke prediction unit is useful in determining in which cylinder combustion torque should be generated first for a rapid engine start and suppression of worsening of emission, when the internal combustion engine in an engine stopped state is started. Then, an expansion stroke cylinder predicted to be in an expansion stroke by the combustion stroke prediction unit generates combustion torque in the cylinder when an engine start is performed, whereby the combustion torque is transmitted to a crankshaft smoothly. Accordingly, the expansion stroke cylinder is preferable as a cylinder for generating combustion torque first at the time of engine start.

In the expansion stroke cylinder, fuel is injected from the intake passage injection valve by the preliminary fuel injection unit just before the internal combustion engine is stopped. The injected fuel is introduced into the expansion stroke cylinder. Here, since an engine stop of the internal combustion engine is prepared by the engine stopping unit, the fuel introduced in the expansion stroke cylinder is kept in the cylinder without being ignited by the ignition plug. As for the fuel kept in the cylinder, atomization is facilitated by the engine heat of the internal combustion engine in which combustion has been performed until just before and which is kept warm, whereby the air-fuel mixture is diffused uniformly inside the cylinder.

Here, the amount of fuel injected by the preliminary fuel injection unit is a predetermined amount. This is because that when the fuel injected by the preliminary fuel injection unit becomes excessive, vaporization of the fuel is facilitated inside the expansion stroke cylinder, which may cause an ignition before the engine stop or right after the engine stop. Accordingly, a predetermined amount is an amount of a level capable of preventing an ignition of fuel in the expansion stroke cylinder. On the other hand, atomization of the fuel is facilitated by keeping the fuel inside the expansion stroke cylinder, so it is preferable that such a predetermined amount be as large as possible.

Further, with the preliminary fuel injection unit, fuel injected from the intake passage injection valve into the intake passage is kept in the cylinder, whereby adhesion of the fuel to the inner wall of the cylinder can be prevented, so further atomization of the injected fuel is facilitated.

When an engine start is to be performed in the internal combustion engine in an engine stopped state, fuel is further injected from the cylinder fuel injection valve into the expansion stroke cylinder, within which fuel has been kept, by the engine starting unit so as to ignite the air-fuel mixture. Thereby, combustion torque is generated, so that the engine start is performed.

In this way, in an engine starting control system that an engine start is performed in an internal combustion engine in which an eco-run control is performed, in an expansion stroke cylinder where combustion is first performed at the time of engine start, atomization of the fuel is facilitated and a unified air-fuel mixture is prepared. Accordingly, a rapid engine start becomes possible, and suppression of worsening of emission at the time of engine start is also possible.

Here, in the engine starting control system of the internal combustion engine, the fuel amount injected from the cylinder injection valve by the engine starting unit may be such an amount that a predetermined amount is subtracted from the total amount of engine starting fuel required for an engine start in the expansion stroke cylinder.

That is, in the expansion stroke cylinder, injected fuel from the intake passage injection valve and injected fuel from the cylinder injection valve are introduced, so both of them constitutes the total engine start amount. Thereby, an appropriate amount of fuel for an engine start is introduced in the cylinder, so it is possible to prevent deterioration in engine starting property due to fuel shortage and worsening of emission due to excessive fuel and the like.

In the engine starting control system of the internal combustion engine, the preliminary fuel injection unit may further inject fuel of a predetermined injection amount for a compression stroke cylinder from the intake passage injection valve into the intake passage just before the internal combustion engine comes to an engine stopped state in the compression stroke cylinder in which a combustion stroke predicted by the combustion stroke prediction unit is a compression stroke, and the engine starting unit may further perform, in the compression stroke cylinder, an engine start by injecting fuel from the cylinder injection valve into the cylinder, and igniting the air-fuel mixture in the cylinder by the ignition plug subsequent to the expansion stroke cylinder.

When performing an engine start of the internal combustion engine in an engine stopped state, a cylinder preferable for generating combustion torque first is an expansion stroke cylinder which reaches an expansion stroke when the internal combustion engine comes to an engine stopped state, as described above. A cylinder preferable for generating combustion torque next is a compression stroke cylinder which reaches an expansion stroke subsequent to the expansion stroke cylinder. Even in the compression stroke cylinder, fuel is kept inside the cylinder by the preliminary injection unit as same as the case of the expansion stroke cylinder so as to realize a uniform diffusion by atomization, and further, ignition is performed by the engine starting unit subsequent to the expansion stroke cylinder. Thereby, more rapid engine start and more reliable suppression of worsening of emission at the time of engine start become possible.

Note that a predetermined injection amount for a compression stroke cylinder may be the same amount as a predetermined amount in an expansion stroke cylinder, provided that the amount is a level at which fuel kept in a compression stroke cylinder does not self-ignite. Further, the amount may be smaller than a predetermined amount in an expansion stroke cylinder considering the fact that the engine rotational speed increases by combustion torque in the expansion stroke cylinder.

Secondly, in order to solve the aforementioned problems, the present invention focuses attention on, in an internal combustion engine in which an eco-run control is performed, fuel injection in a cylinder reaching an expansion stroke and in a cylinder reaching a compression stroke when the internal combustion engine comes to an engine stopped state. With fuel injection in a cylinder reaching an expansion stroke, an engine start is performed rapidly, and with fuel injection in a cylinder reaching a compression stroke, worsening of emission at the time of engine start can be suppressed as much as possible.

Thus, the present invention provides an engine starting control system of an internal combustion engine including: a plurality of cylinders, each of which has an intake passage injection valve for injecting fuel into an intake passage, a cylinder injection valve for injecting fuel into a cylinder, and an ignition plug for igniting an air-fuel mixture in a cylinder; and an engine stopping unit to perform an engine stop of the internal combustion engine when a predetermined condition is satisfied in an operating state of the internal combustion engine. The system includes: a combustion stroke prediction unit to predict a combustion stroke that a cylinder of the internal combustion engine reaches when the internal combustion engine comes to an engine stopped state by the engine stopping unit; a preliminary fuel injection unit to inject fuel of a predetermined amount for a compression stroke cylinder from the intake passage injection valve into the intake passage just before the internal combustion engine comes to an engine stopped state, in the compression stroke cylinder in which a combustion stroke predicted by the combustion stroke prediction unit is an compression stroke; and an engine starting unit to perform an engine start of the internal combustion engine in an engine stopped state by, in the expansion stroke cylinder in which a combustion stroke predicted by the combustion stroke prediction unit is an expansion stroke, injecting fuel from the cylinder injection valve and igniting the air-fuel mixture in the cylinder by the ignition plug, and then in the compression stroke cylinder, igniting the air-fuel mixture in the cylinder by the ignition plug.

In the internal combustion engine, when fuel supply to each fuel injection valve is performed by a mechanical pump driven by the engine output of the internal combustion engine, the engine rotational speed of the internal combustion engine is low at the time of engine start. Therefore, pressure applied to the fuel by the mechanical pump is lowered. Consequently, there may be a case where atomization of fuel is inhibited and emission becomes worse.

To cope with this, when an internal combustion engine in an engine stopped state is started, combustion torque is generated in an expansion stroke cylinder first. At this time, fuel injection in the expansion stroke cylinder is performed only from a cylinder fuel injection valve for generating combustion torque more efficiently. A cylinder for generating combustion torque next is a compression stroke cylinder. At this time, fuel injection is performed only from an intake passage injection valve considering suppression of worsening of emission.

By controlling fuel injection in this way and igniting the air-fuel mixture in each cylinder, in an expansion stroke cylinder, the engine rotational speed is rapidly increased as much as possible with the generated combustion torque so as to increase the pressure to be applied to the fuel by the mechanical pump. Further, in a compression stroke cylinder, the fuel is atomized by the fuel injection from the intake passage injection valve so as to diffuse the air-fuel mixture uniformly, as described above. Thereby, a rapid engine start becomes possible, and suppression of worsening of emission at the time of engine start becomes also possible.

According to the present invention, in an internal combustion engine in which an eco-run control is performed, it is possible to perform a rapid engine start and to suppress worsening of emission at the time of engine start.

BEST MODES FOR CARRYING OUT THE INVENTION

Here, embodiments of an engine starting control system of an internal combustion engine according to the present invention will be described based on the drawings.

Embodiment 1

Figure 1:
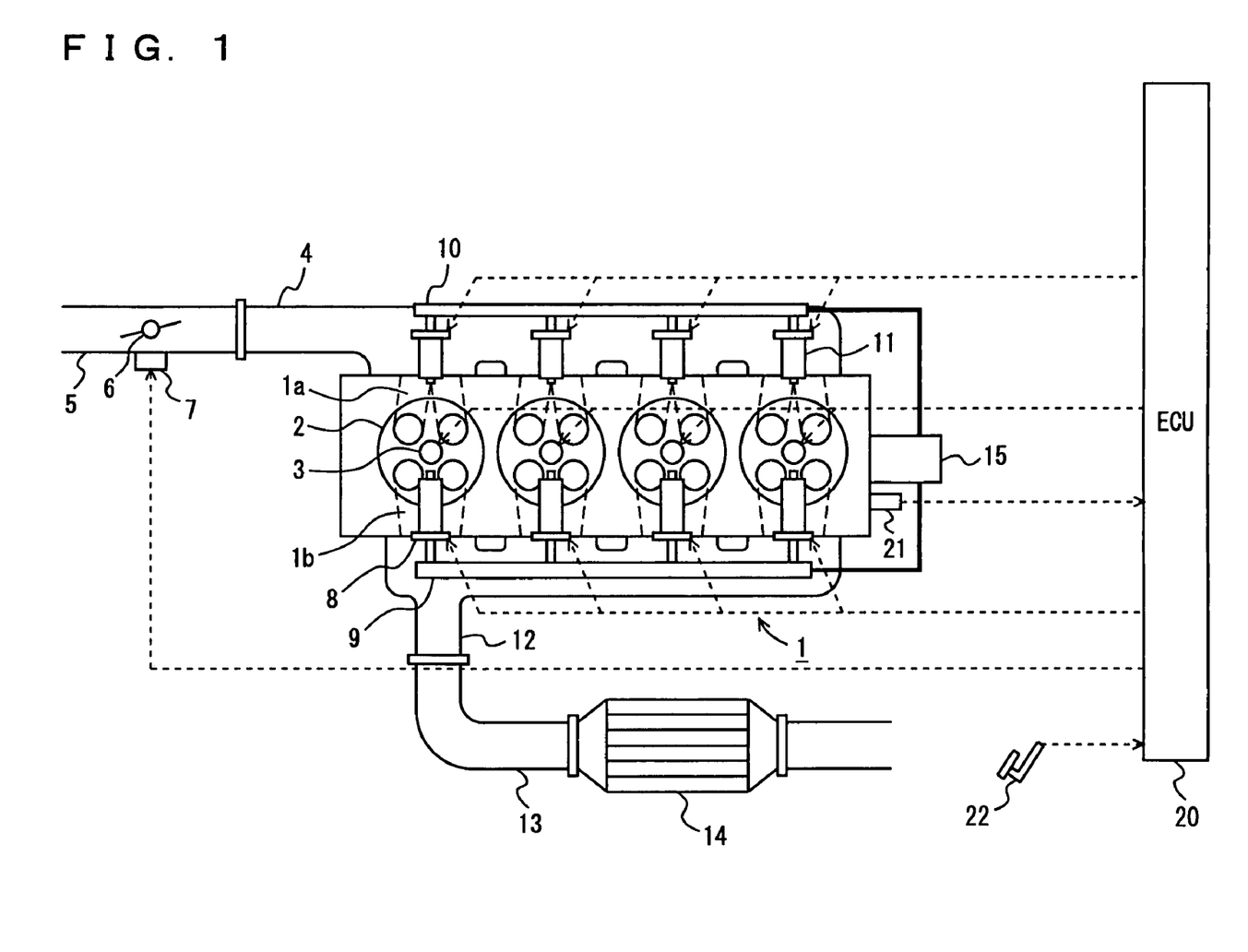
FIG. 1 is a diagram showing the schematic configuration of an engine starting control system of an internal combustion engine according to an embodiment of the present invention.

FIG. 1 is a block diagram showing the schematic configuration of an internal combustion engine 1 to which the engine starting control system of the present invention is applied, and its control system.

Internal combustion engine 1 has four cylinders 2 (hereinafter, each cylinder is denoted by an identification number of #1, #2, #3 or #4, from the left side of FIG. 1), and is an engine for driving a vehicle. Internal combustion engine 1 includes fuel injection valves 8 (hereinafter, each fuel injection valve is denoted by an identification number of #1, #2, #3 or #4, similar to the identification numbers of the cylinders) for injecting fuel into respective cylinders 2, and fuel injection valves 11 (hereinafter, each fuel injection valve is denoted by an identification number of #1, #2, #3 or #4, similar to the identification numbers of the cylinders) for injecting fuel to intake ports 1a (hereinafter, each intake port is denoted by an identification number of #1, #2, #3 or #4, similar to the identification numbers of the cylinders) of respective cylinders 2. Fuel injection vales 8 and fuel injection valves 11 are connected with a pressure accumulator 9 and a pressure accumulator 10, in each of which pressure is accumulated to be a predetermined pressure by force-feeding fuel from a mechanical pump 15 driven by the engine output of internal combustion engine 1. Further, each cylinder 2 is provided with an ignition plug 3 (hereinafter, each ignition plug is denoted by an identification number of #1, #2, #3 or #4, similar to the identification number of cylinder) for igniting an air-fuel mixture.

Next, internal combustion engine 1 is connected with an intake branch pipe 4. Each branch pipe of intake branch pipe 4 is communicated with a combustion chamber via intake port 1a of cylinder 2. Further, intake branch pipe 4 is connected with an intake pipe 5, and in the middle of intake pipe 5, there is provided an intake restriction valve 6 for regulating the intake air flow amount flowing through intake pipe 5. Intake restriction valve 6 is driven by an actuator 7, whereby the opening thereof is adjusted.

On the other hand, internal combustion engine 1 is connected with an exhaust branch pipe 12. Each branch pipe of exhaust branch pipe 12 is communicated with a combustion chamber of cylinder 2 via an exhaust port 1b. Further, exhaust branch pipe 12 is connected with an exhaust pipe 13 which is connected with a muffler (not shown) in the downstream. In the middle of exhaust pipe 13, there is provided an NOx catalyst 14 for occluding and reducing NOx in the exhaust gas exhausted from internal combustion engine 1 so as to perform NOx purification in the exhaust gas.

Further, internal combustion engine 1 is provided with an electronic control unit (hereinafter referred to as "ECU") 20 for controlling the internal combustion engine and each component of the engine starting control system. ECU 20 includes a CPU as well as a ROM, a RAM and the like for storing various programs and maps described later, and controls each component according to the operating conditions of internal combustion engine 1, requests from the driver, and the like.

Here, actuator 7 for driving ignition plugs 3, fuel injection valves 8, fuel injection valves 11 and intake restriction valve 6 operates corresponding to control signals from electronic control unit (hereinafter, referred to as "ECU") 20. Further, ECU 20 is connected electrically with a crank position sensor 21 and an accelerator opening sensor 22, and the rotational angle and the engine rotational speed of a crankshaft of internal combustion engine 1 and the accelerator opening degree are detected by them.

In internal combustion engine 1 configured in this manner, a so-called eco-run control is performed. Specifically, when a vehicle mounting internal combustion engine 1 is in a travel stopped state for waiting at a red light or the like, internal combustion engine 1 is stopped, and when the vehicle is in a traveling state again, internal combustion engine 1 which is in an engine stopped state is started, whereby an improvement in fuel consumption and the like is realized. That is, if it is determined that internal combustion engine 1 is not required to be driven based on signals from crank position sensor 21, accelerator opening sensor 22 and the like, internal combustion engine 1 is caused to be stopped.

Figure 2:
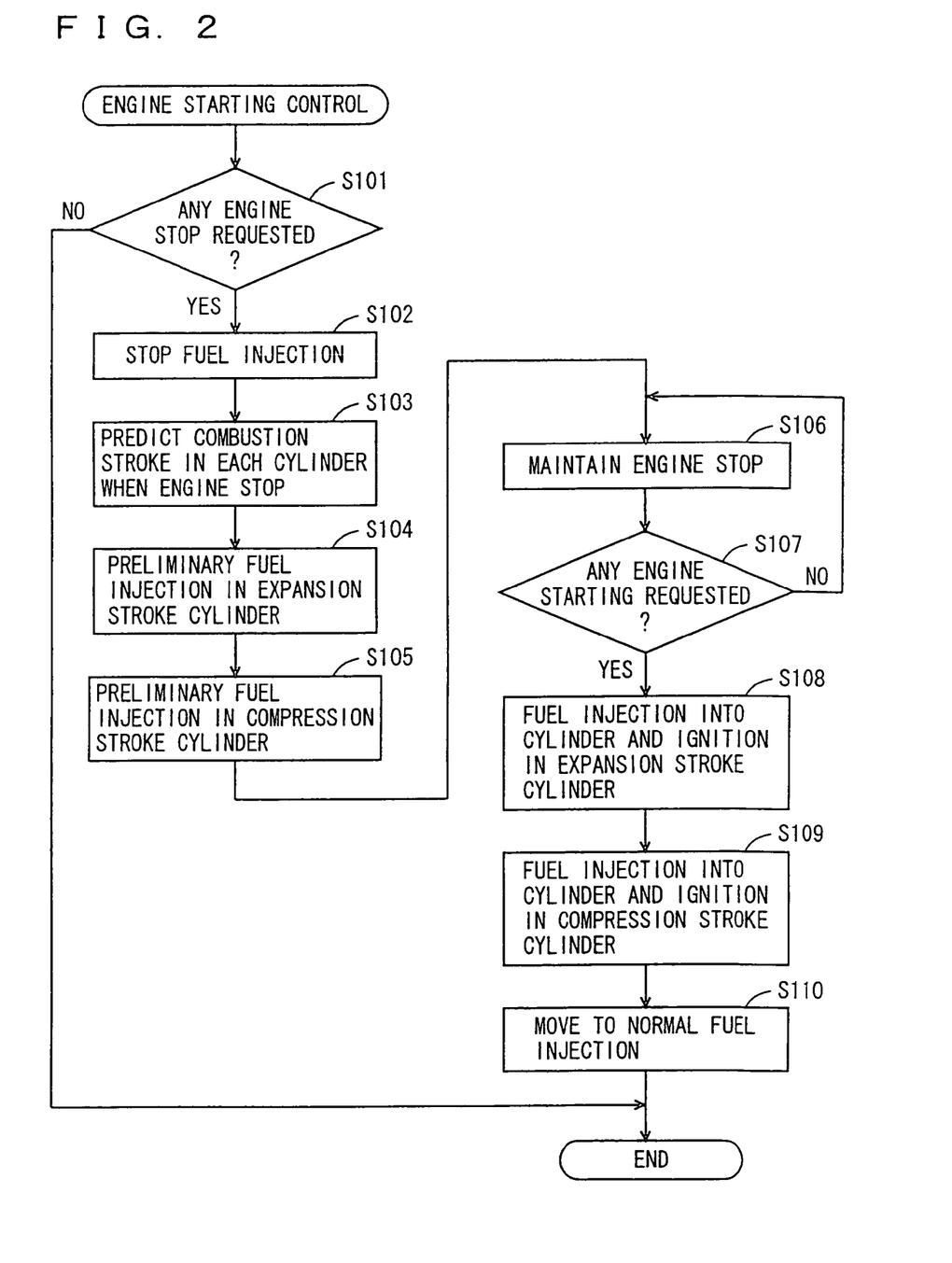
FIG. 2 is a flow chart relating to an engine starting control for performing engine start of an internal combustion engine in an engine starting control system of an internal combustion engine according to a first embodiment of the present invention.

Although an improvement in fuel consumption is realized by performing the eco-run control, it is required to perform a rapid engine start when internal combustion engine 1 is started, and also required to prevent worsening of emission at the time of engine start. Therefore, in internal combustion engine 1, an engine starting control shown in FIG. 2 is performed. The engine starting control is a routine performed repeatedly at a constant cycle by ECU 20 when internal combustion engine 1 is in a normal operating state, that is, the eco-run control is not performed. Note that when internal combustion engine 1 is in a normal operating state, fuel injection from fuel injection vales 8 and 11 is controlled according to the load of the internal combustion engine.

Figure 3:
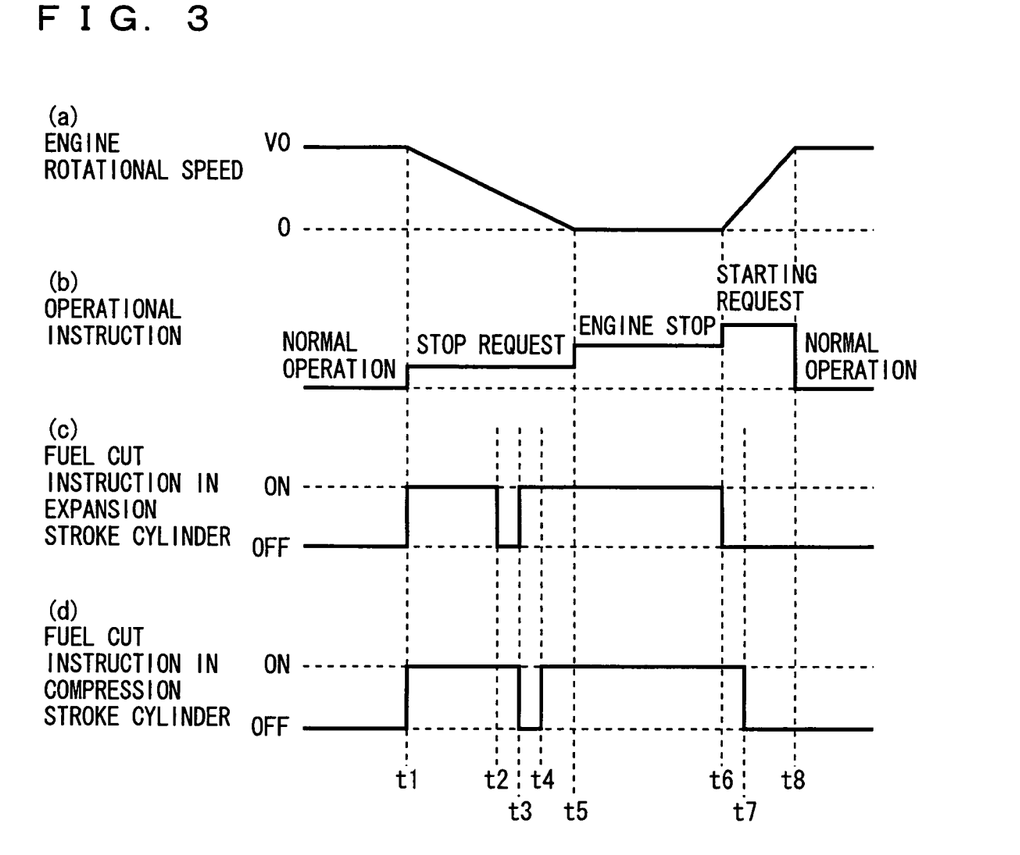
FIG. 3 is a timing chart, when the engine starting control shown in FIG. 2 is performed, showing (a) transition of engine rotational speed of the internal combustion engine, (b) changes in an operating instruction outputted to the internal combustion engine, (c) changes in a fuel cut instruction in an expansion stroke cylinder, and (d) changes in a fuel cut instruction in a compression stroke cylinder.

Further, FIG. 3 is a timing chart, when the engine starting control shown in FIG. 2 is performed, showing (a) transition of engine rotational speed of internal combustion engine 1, (b) changes in an operating instruction outputted from ECU 20 to internal combustion engine 1, (c) changes in a fuel cut instruction in an expansion stroke cylinder described later, and (d) changes in a fuel cut instruction in a compression stroke cylinder described later. Note that when the fuel cut instructions in (c) and (d) of FIG. 3 are ON, fuel injection is not performed in each cylinder, and when the fuel cut instructions are OFF, fuel injection is performed.

Hereinafter, an engine starting control in internal combustion engine 1 in which the eco-run control is performed will be described based on FIGS. 2 and 3.

In S101, it is determined whether an engine stop request is outputted in internal combustion engine 1. That is, it is determined whether the operating state of internal combustion engine 1 satisfies the conditions for performing engine stop by the eco-run control. Specifically, it is determined that internal combustion engine 1 is in an idle operating state so that travel stop of the vehicle mounting internal combustion engine 1 is predicted, or the vehicle is performing deceleration operation, based on signals from crank position sensor 21 and accelerator opening sensor 22. When it is determined that an engine stop request is outputted, the control proceeds to S102, and if it is determined that an engine stop request is not outputted, the control ends.

In S102, when an engine stop request is received, fuel injection from fuel injection valves 8 and 11 in each cylinder 2 is stopped. That is, a fuel cut instruction in each cylinder 2 becomes ON. Note that a point where processing of S102 is performed corresponds to a timing t1 in FIG. 3. With fuel injection in each cylinder being stopped, the engine rotational speed of internal combustion engine 1 is getting lowered. When the processing of S102 ends, the control proceeds to S103.

In S103, it is predicted based on a signal from crank position sensor 21 that when internal combustion engine 1 comes to an engine stopped state, which combustion stroke, among an intake stroke, a compression stroke, an expansion stroke and an exhaust stroke, each cylinder of cylinders 2 #1 to 2 #4 reaches. That is, in a state where internal combustion engine 1 is not stopped completely (in a period between timings t1 and t2 in FIG. 3), a combustion stroke that each cylinder reaches when the internal combustion engine 1 is stopped completely is predicted. Note that a combustion stroke stated here refers to a combustion stroke that each cylinder reaches generally, assuming the combustion being performed, although fuel injection is stopped so combustion is not performed in each cylinder.

A prediction of a combustion stroke of each cylinder is performed based on the relationship between a signal from crank position sensor 21 and the engine rotational speed at that time, specifically. Here, a cylinder reaching an expansion stroke when internal combustion engine 1 comes to an engine stopped state is called an expansion stroke cylinder. In the present embodiment, cylinder 2 #1 is assumed to be an expansion stroke cylinder. Further, a cylinder reaching a compression stroke when internal combustion engine 1 comes to an engine stopped state is called a compression stroke cylinder. In the present embodiment, cylinder 2 #3 is assumed to be a compression stroke cylinder. In this case, when internal combustion engine 1 comes to an engine stopped state, cylinder 2 #4 reaches an intake stroke, and cylinder 2 #2 reaches an exhaust stroke. When the processing of S103 ends, the control proceeds to S104.

In S104, preliminary fuel injection is performed in expansion stroke cylinder 2 #1 just before the engine stop of internal combustion engine 1. This preliminary fuel injection is fuel injection performed from fuel inject valve 11 #1 to intake port 1a #1. In more detail, an injection timing of the preliminary fuel injection is a period between the exhaust stroke just before the engine stop of internal combustion engine 1 and the intake stroke in expansion stroke cylinder 2 #1 (that is, a fuel cut instruction becomes OFF in a period between timings t2 and t3 in FIG. 3). The injected fuel is introduced in expansion stroke cylinder 2 #1 in the subsequent intake stroke. Further, since the internal combustion engine is stopped in the expansion stroke through the subsequent compression stroke, in expansion stroke cylinder 2 #1, fuel injected by the preliminary fuel injection is kept therein in a state of reaching the expansion stroke. Note that the fuel amount injected by the preliminary fuel injection is set to a predetermined amount of a level at which the fuel does not cause self ignition due to a compression heat when the air-fuel mixture is compressed in the compression stroke.

The fuel injected by the preliminary fuel injection is in a state of being kept in expansion stroke cylinder 2 #1 in which normal operation has been performed until just before. Therefore, atomization is facilitated with the residual heat, so that the fuel is diffused uniformly within expansion stroke cylinder 2 #1. Further, since the fuel amount is set to a predetermined amount, there is no fear that the fuel inside expansion stroke cylinder 2 #1 is self-ignited in the vicinity of the dead point on the compression stroke, in particular. When the processing of S104 ends, the control proceeds to S105.

In S105, the preliminary fuel injection is performed in compression stroke cylinder 2 #3 just before the engine stop of internal combustion engine 1. This preliminary fuel injection is a fuel injection performed from fuel injection valve 11 #3 to intake port 1a #3. In more detail, the injection timing of the preliminary fuel injection is a period from the exhaust stroke just before the engine stop of internal combustion engine 1 to the intake stroke in compression stroke cylinder 2 #3 (that is, a fuel cut instruction becomes OFF in a period between timings t3 and t4 in FIG. 3). The injected fuel is introduced into compression stroke cylinder 2 #3 in the subsequent intake stroke. Further, since the internal combustion engine is stopped in the subsequent compression stroke, compression stroke cylinder 2 #3 is in a state of reaching the compression stroke while the fuel injected by the preliminary fuel injection is kept therein. Note that the fuel amount of the preliminary fuel injection is set to a predetermined amount of a level at which the fuel does not cause self ignition due to a compression heat when the air-fuel mixture is compressed in the compression stroke.

The fuel injected by the preliminary fuel injection is in a state of being kept in compression stroke cylinder 2 #3 in which normal operation has been performed until just before. Therefore, atomization is facilitated with the residual heat, so that the fuel is diffused uniformly within compression stroke cylinder 2 #3. Further, since the fuel amount is set to a predetermined amount, there is no fear that the fuel in compression stroke cylinder 2 #3 is self-ignited in the vicinity of the dead point on the compression stroke, in particular. When the processing of S105 ends, the control proceeds to S106.

In S106, internal combustion engine 1 is maintained at an engine stopped state by the eco-run control. Note that in the present embodiment, internal combustion engine 1 is in an engine stopped state from a timing t5 in FIG. 3, and the engine rotational speed becomes zero. When the processing of S106 ends, the control proceeds to S107.

In S107, it is determined whether an engine starting request is outputted in internal combustion engine 1. That is, it is determined whether internal combustion engine 1, which is in a stopped state by the eco-run control, is in a state that it should be started. Specifically, a case where, in a vehicle mounting internal combustion engine 1 in an idle operating state, a starting operation such as pressing the accelerator is performed, or a case where the vehicle performing a deceleration operation tries to perform an acceleration operation or the like is detected as a case of an engine starting request being outputted, based on signals from crank position sensor 21 and accelerator opening sensor 22. When it is determined that an engine starting request is outputted, the control proceeds to S108, and when it is determined that an engine starting request is not outputted, the control returns to S106, and the engine stop of internal combustion engine 1 is maintained.

In S108, in internal combustion engine 1 in an engine stopped state, fuel injection is performed in expansion stroke cylinder 2 #1 from fuel injection valve 8 #1 into the cylinder, and the air-fuel mixture in the cylinder is ignited by ignition plug 3 #1 (this processing is performed at a timing t6 in FIG. 3). Thereby, combustion torque is generated in cylinder 2 #1. When expansion stroke cylinder 2 #1 is in an engine stopped state, it reaches the expansion stroke. Therefore, the generated combustion torque is transmitted to a crankshaft via a piston within the cylinder, whereby the engine rotational speed increases.

Note that in order to exhibit a torque requested for starting internal combustion engine 1 in expansion stroke cylinder 2 #1, the fuel injection amount injected from fuel injection valve 8 #1 in S108 is such an amount that the fuel amount injected from fuel injection valve 11 #1 by the preliminary fuel injection in S104 is subtracted from the fuel amount corresponding to the requested torque. Thereby, engine start is performed with an appropriate amount of fuel for the engine start, so it is possible to prevent deterioration in the engine starting performance due to fuel shortage, worsening of emission due to excessive fuel, and the like. When the processing of S108 ends, the control proceeds to S109.

In S108, combustion is performed in expansion stroke cylinder 2 #1, whereby the engine rotational speed increases and compression stroke cylinder 2 #3, which has reached the compression stroke at the time of engine stop, reaches the expansion stroke. Then, in S109, fuel injection is performed from fuel injection valve 8 #3 into the cylinder, and further the air-fuel mixture in the cylinder is ignited by ignition plug 3 #3 at the timing that compression stroke cylinder 2 #3 reaches the expansion stroke (this processing is performed at a timing t7 in FIG. 3). Thereby, combustion torque is generated in compression stroke cylinder 2 #3, so that the engine rotational speed further increases.

Note that in order to exhibit torque requested for starting internal combustion engine 1 in compression stroke 2 #3, the fuel injection amount injected from fuel injection valve 8 #3 in S109 is such an amount that the fuel amount injected from fuel injection valve 11 #3 by the preliminary fuel injection in S105 is subtracted from the fuel amount corresponding to the requested torque. Thereby, engine start is performed with the amount of fuel appropriate for the engine start, so it is possible to prevent deterioration in the engine starting performance due to fuel shortage, worsening of emission due to excessive fuel, and the like. When the processing of S109 ends, the control proceeds to S110.

In S110, subsequent fuel injection in each cylinder 2 is moved to a normal fuel injection and ignition. The normal fuel injection and the like are fuel injection and ignition according to the load of internal combustion engine 1 performed in a normal operating state. Thereby, the engine rotational speed of internal combustion engine 1 increases further, and at a timing t8 in FIG. 3, an intended engine rotational speed V0 is attained.

According to the present control, when an engine starting request is outputted in internal combustion engine 1 in an engine stopped state, combustion is performed in each cylinder 2 starting from expansion stroke cylinder 2 #1, whereby engine start is performed rapidly with the combustion torque.

Further, in the combustion in expansion stroke cylinder 2 #1, fuel kept in expansion stroke cylinder 2 #1 by the preliminary fuel injection and fuel injected in S108 are provided for the combustion. Here, since the fuel injected by the preliminary fuel injection is diffused uniformly within cylinder 2 #1, it is possible to suppress the air-fuel mixture in the cylinder to be too dense locally, as much as possible. This also applies to compression stroke cylinder 2 #3. Consequently, it is possible to suppress worsening of emission at the time of engine start of internal combustion engine 1.

Embodiment 2

Figure 4:
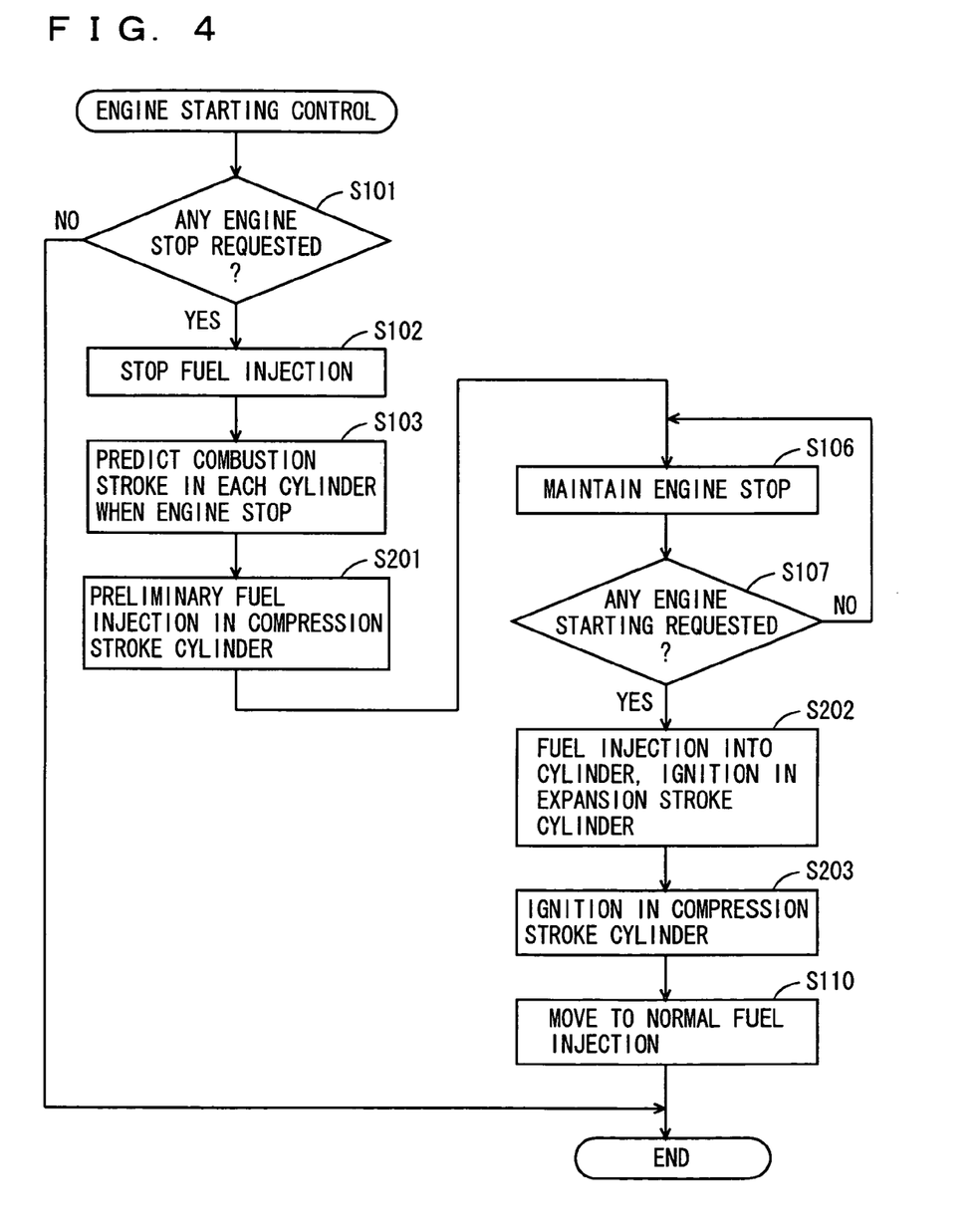
FIG. 4 is a flow chart relating to an engine starting control for performing engine start of an internal combustion engine in an engine starting control system of an internal combustion engine according to a second embodiment of the present invention.

A second embodiment of the engine starting control system of an internal combustion engine according to the present invention will be described based on FIGS. 4 and 5. FIG. 4 shows a flow of an engine starting control for performing engine start of internal combustion engine 1 shown in FIG. 1. The engine starting control is a routine performed repeatedly at a constant cycle by ECU 20 when internal combustion engine 1 is in a normal operating state, that is, the eco-run control is not performed.

Figure 5:
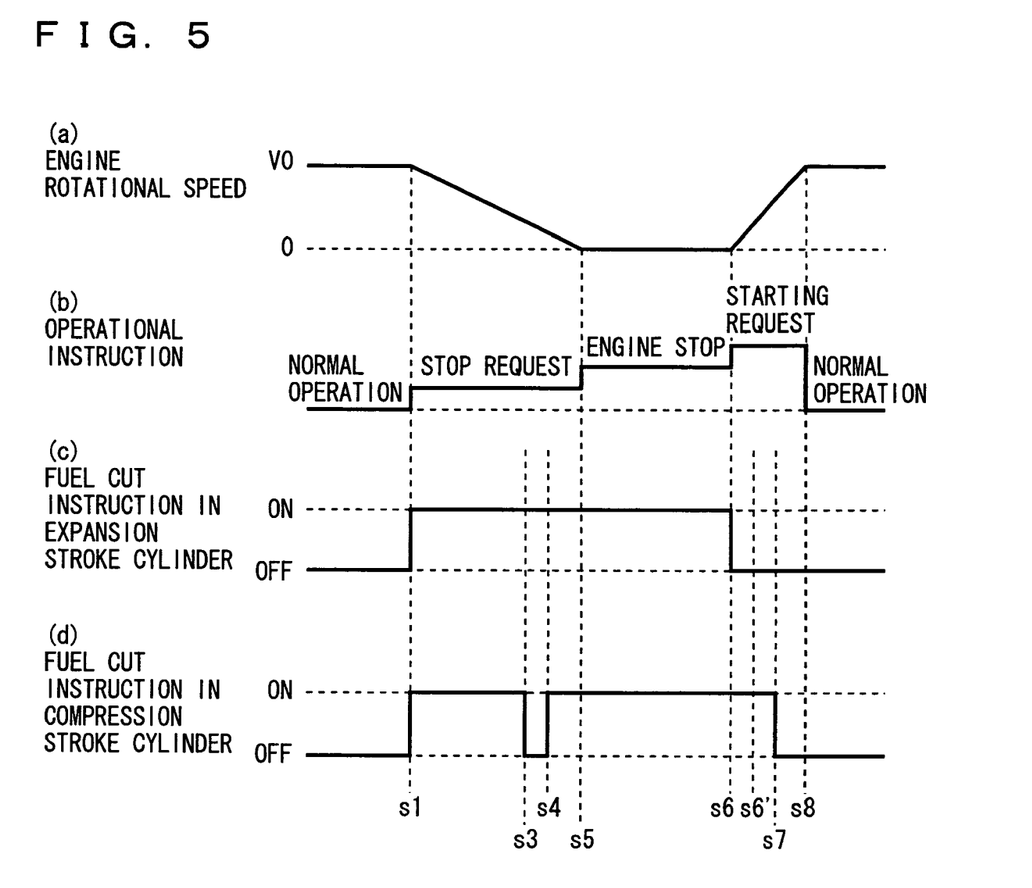
FIG. 5 is a timing chart, when the engine starting control shown in FIG. 4 is performed, showing (a) transition of engine rotational speed of the internal combustion engine, (b) changes in an operating instruction outputted to the internal combustion engine, (c) changes in a fuel cut instruction in an expansion stroke cylinder, and (d) changes in a fuel cut instruction in a compression stroke cylinder.

Further, FIG. 5 is a timing chart, when the engine starting control shown in FIG. 4 is performed, showing (a) transition of engine rotational speed of internal combustion engine 1, (b) changes in an operating instruction outputted from ECU 20 to internal combustion engine 1, (c) changes in a fuel cut instruction in the expansion stroke cylinder, and (d) changes in a fuel cut instruction in the compression stroke cylinder. Note that when the fuel cut instructions in (c) and (d) of FIG. 5 are ON, fuel injection is not performed in each cylinder, and when the fuel cut instructions are OFF, fuel injection is performed.

Hereinafter, an engine starting control in internal combustion engine 1 in which the eco-run control is performed will be described based on FIGS. 4 and 5. Here, processing in the engine starting control shown in FIG. 4, same as that of the engine starting control shown in FIG. 2, is denoted by the same reference numeral and the detailed description thereof will not be given.

In the present embodiment, when the processing of S103 ends, the control proceeds to S201. Note that a timing s1 in FIG. 5 corresponds to timing t1 in FIG. 3. Further, also in the present embodiment, cylinder 2 #1 is assumed to be an expansion stroke cylinder and cylinder 2 #3 is assumed to be a compression stroke cylinder, similar to the first embodiment.

In S201, preliminary fuel injection is performed in compression stroke cylinder 2 #3 just before the engine stop of internal combustion engine 1. This preliminary fuel injection is same as the processing S105 in the engine starting control of the first embodiment. The injection timing of the preliminary fuel injection is a period from the exhaust stroke just before the engine stop of internal combustion engine 1 to the intake stroke in compression stroke cylinder 2 #3 (that is, a fuel cut instruction becomes OFF in a period between timings s3 and s4 in FIG. 5). The injected fuel is then introduced into compression stroke cylinder 2 #3 in the subsequent intake stroke. Further, since internal combustion engine 1 is stopped in the subsequent compression stroke, compression stroke cylinder 2 #3 is in a state of reaching the compression stroke while the fuel injected by the preliminary fuel injection is kept therein. Note that the fuel amount of the preliminary fuel injection is set to a predetermined amount of a level at which the fuel does not cause self ignition due to a compression heat when the air-fuel mixture is compressed in the compression stroke.

The fuel injected by the preliminary fuel injection is in a state of being kept in compression stroke cylinder 2 #3 in which normal operation has been performed until just before. Therefore, atomization is facilitated with the residual heat, so that the fuel is diffused uniformly within compression stroke cylinder 2 #3. Further, since the fuel amount is set to a predetermined amount, there is no fear that the fuel inside compression stroke cylinder 2 #3 is self-ignited in the vicinity of the dead point on the compression stroke, in particular. Note that in the present embodiment, preliminary fuel injection is not performed in expansion stroke cylinder 2 #1 just before the engine atop, different from the first embodiment. When the processing of S201 ends, the control proceeds to S106.

Further, in the present embodiment, if an engine starting request is outputted in S107, the control proceeds to S202. In S202, in internal combustion engine 1 in an engine stopped state, fuel injection is performed in expansion stroke cylinder 2 #1 from fuel injection valve 8 #1 into the cylinder, and further the air-fuel mixture in the cylinder is ignited by ignition plug 3 #1 (this processing is performed at timing s6 in FIG. 3). Thereby, combustion torque is generated in expansion stroke cylinder 2 #1. When expansion stroke cylinder 2 #1 is in an engine stopped state, it has reached the expansion stroke. Thereby, the generated combustion torque is transmitted to a crankshaft via a piston inside the cylinder, so that the engine rotational speed increases.

Note that in order to exhibit a torque requested for starting internal combustion engine 1, the fuel injection amount injected from fuel injection valve 8 #1 in S202 is a fuel amount according to the requested torque. When the processing of S202 ends, the control proceeds to S203.

In S202, combustion is performed in expansion stroke cylinder 2 #1, whereby the engine rotational speed increases and compression stroke cylinder 2 #3, which has reached the compression stroke at the time of engine stop, reaches the expansion stroke. Then, in S203, the air-fuel mixture in the cylinder is ignited by ignition plug 3 #3 at the timing that compression stroke cylinder 2 #3 reaches the expansion stroke (this processing is performed at a timing s6' in FIG. 3). Thereby, combustion torque is generated in compression stroke cylinder 2 #3, so that the engine-rotational speed further increases. When the processing of S203 ends, the control proceeds to S110.

Note that the a timing s7 in the figure in the present embodiment shows a timing after ignition in S203 and fuel injection is started again in a normal operation in compression stroke cylinder 2 #3. Further, a timing s8 in FIG. 5 corresponds to timing t8 in FIG. 3.

According to the present control, when an engine starting request is outputted in internal combustion engine 1 in an engine stopped state, combustion is performed in each cylinder 2 starting from expansion stroke cylinder 2 #1. Thereby, engine start is performed rapidly with the combustion torque generated therein.

Further, in the first combustion in expansion stroke cylinder 2 #1, fuel is injected directly into the cylinder solely from fuel injection valve 8 #1, and fuel injection from fuel injection valve 11 #1 is not performed. Accordingly, it is impossible to enjoy an effect of suppressing worsening of emission by the preliminary fuel injection as described above with the combustion in expansion stroke cylinder 2 #1. However, combustion torque generated by the direct fuel injection into the cylinder is relatively high, which enables to increase the engine rotational speed higher more rapidly. As a result, the engine output transmitted to mechanical pump 15 increases, so that the pressures in pressure accumulator 10 and pressure accumulator 9 rise. Due to the higher pressures in the pressure accumulated chambers, atomization of injected fuel is facilitated, whereby it is possible to suppress worsening of emission by subsequent combustion of fuel injected from each fuel injection valve.

Note that in compression stroke cylinder 2 #3 in which combustion is performed subsequent to expansion stroke cylinder 2 #1 at the time of engine start, fuel kept inside compression stroke cylinder 2 #3 by the preliminary fuel injection is burned. However, since the fuel injected by the preliminary fuel injection is diffused uniformly within compression stroke cylinder 2 #3, it is possible to suppress the air-fuel mixture in the cylinder to be too dense locally, as much as possible. Consequently, worsening of emission when starting internal combustion engine 1 can be suppressed.

In the present embodiment, fuel injection from fuel injection valve 8 #3 into compression stroke cylinder 2 #3 is not performed in S203. This is because the engine rotational speed is considered to become relatively high with the combustion in expansion stroke cylinder 2 #1 in S202, so the fuel amount provided to combustion in compression stroke cylinder 2 #3, which is the next combustion, is reduced. This is based on a consideration that the fuel amount for the preliminary fuel injection is limited not more than a predetermined amount so as to prevent self ignition of the fuel. However, when the fuel amount for the preliminary fuel injection is not enough for engine start of internal combustion engine 1, fuel injection may be performed from fuel injection valve 8 #3 in S203.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An engine starting control system of an internal combustion engine including: a plurality of cylinders, each of which has an intake passage injection valve for injecting fuel into an intake passage, a cylinder injection valve for injecting fuel into a cylinder, and an ignition plug for igniting an air-fuel mixture in a cylinder; and engine stopping means for performing an engine stop of the internal combustion engine when a predetermined condition is satisfied in an operating state of the internal combustion engine, the system comprising:

combustion stroke prediction means for predicting a combustion stroke that a cylinder of said internal combustion engine reaches when said internal combustion engine comes to an engine stopped state by said engine stopping means;

preliminary fuel injection means for injecting fuel of a predetermined amount from said intake passage injection valve into the intake passage just before said internal combustion engine comes to an engine stopped state, in an expansion stroke cylinder in which a combustion stroke predicted by said combustion stroke prediction means is an expansion stroke; and engine starting means for performing, in said expansion stroke cylinder, an engine start of the internal combustion engine in an engine stopped state by injecting fuel from said cylinder injection valve into the cylinder and igniting an air-fuel mixture in the cylinder by said ignition plug.

2. The engine starting control system of the internal combustion engine according to claim 1, wherein said preliminary fuel injection means further injects fuel of a predetermined injection amount for a compression stroke cylinder from said intake passage injection valve into the intake passage just before said internal combustion engine comes to an engine stopped state in a compression stroke cylinder in which a combustion stroke predicted by said combustion stroke prediction means is a compression stroke, and said engine starting means further performs, in said compression stroke cylinder, an engine start by injecting fuel from said cylinder injection valve into the cylinder, and igniting an air-fuel mixture in the cylinder by said ignition plug subsequent to said expansion stroke cylinder.

3. The engine starting control system of the internal combustion engine according to claim 1, wherein a fuel amount injected from said cylinder injection valve by said engine starting means is such an amount that said predetermined amount is subtracted from a total amount of engine starting fuel required for an engine start in said expansion stroke cylinder.

4. The engine starting control system of the internal combustion engine according to claim 3, wherein said preliminary fuel injection means further injects fuel of a predetermined injection amount for a compression stroke cylinder from said intake passage injection valve into the intake passage just before said internal combustion engine comes to an engine stopped state in a compression stroke cylinder in which a combustion stroke predicted by said combustion stroke prediction means is a compression stroke, and said engine starting means further performs, in said compression stroke cylinder, an engine start by injecting fuel from said cylinder injection valve into the cylinder, and igniting an air-fuel mixture in the cylinder by said ignition plug subsequent to said expansion stroke cylinder.

5. An engine starting control system of an internal combustion engine including: a plurality of cylinders, each of which has an intake passage injection valve for injecting fuel into an intake passage, a cylinder injection valve for injecting fuel into a cylinder, and an ignition plug for igniting an air-fuel mixture in a cylinder; and an engine stopping unit to perform an engine stop of the internal combustion engine when a predetermined condition is satisfied in an operating state of the internal combustion engine, the system comprising:

a combustion stroke prediction unit to predict a combustion stroke that a cylinder of said internal combustion engine reaches when said internal combustion engine comes to an engine stopped state by said engine stopping unit;

a preliminary fuel injection unit to inject fuel of a predetermined amount from said intake passage injection valve into the intake passage just before said internal combustion engine comes to an engine stopped state, in an expansion stroke cylinder in which a combustion stroke predicted by said combustion stroke prediction unit is an expansion stroke; and an engine starting unit to perform, in said expansion stroke cylinder, an engine start of the internal combustion engine in an engine stopped state by injecting fuel from said cylinder injection valve into the cylinder and igniting an air-fuel mixture in the cylinder by said ignition plug.

6. The engine starting control system of the internal combustion engine according to claim 5, wherein a fuel amount injected from said cylinder injection valve by said engine starting unit is such an amount that said predetermined amount is subtracted from a total amount of engine starting fuel required for an engine start in said expansion stroke cylinder.

7. The engine starting control system of the internal combustion engine according to claim 6, wherein said preliminary fuel injection unit further injects fuel of a predetermined injection amount for a compression stroke cylinder from said intake passage injection valve into the intake passage just before said internal combustion engine comes to an engine stopped state in a compression stroke cylinder in which a combustion stroke predicted by said combustion stroke prediction unit is a compression stroke, and said engine starting unit further performs, in said compression stroke cylinder, an engine start by injecting fuel from said cylinder injection valve into the cylinder, and igniting an air-fuel mixture in the cylinder by said ignition plug subsequent to said expansion stroke cylinder.

8. The engine starting control system of the internal combustion engine according to claim 5, wherein said preliminary fuel injection unit further injects fuel of a predetermined injection amount for a compression stroke cylinder from said intake passage injection valve into the intake passage just before said internal combustion engine comes to an engine stopped state in a compression stroke cylinder in which a combustion stroke predicted by said combustion stroke prediction unit is a compression stroke, and said engine starting unit further performs, in said compression stroke cylinder, an engine start by injecting fuel from said cylinder injection valve into the cylinder, and igniting an air-fuel mixture in the cylinder by said ignition plug subsequent to said expansion stroke cylinder.

9. An engine starting control system of an internal combustion engine including: a plurality of cylinders, each of which has an intake passage injection valve for injecting fuel into an intake passage, a cylinder injection valve for injecting fuel into a cylinder, and an ignition plug for igniting an air-fuel mixture in a cylinder; and engine stopping means for performing an engine stop of the internal combustion engine when a predetermined condition is satisfied in an operating state of the internal combustion engine, the system comprising:

combustion stroke prediction means for predicting a combustion stroke that a cylinder of said internal combustion engine reaches when said internal combustion engine comes to an engine stopped state by said engine stopping means;

preliminary fuel injection means for injecting fuel of a predetermined amount for a compression stroke cylinder from said intake passage injection valve into the intake passage just before said internal combustion engine comes to an engine stopped state, in the compression stroke cylinder in which a combustion stroke predicted by said combustion stroke prediction means is a compression stroke; and engine starting means for performing an engine start of the internal combustion engine in an engine stopped state by, in an expansion stroke cylinder in which a combustion stroke predicted by said combustion stroke prediction means is an expansion stroke, injecting fuel from said cylinder injection valve and igniting an air-fuel mixture in the cylinder by said ignition plug, and then in said compression stroke cylinder, igniting an air-fuel mixture in the cylinder by said ignition plug.

10. An engine starting control system of an internal combustion engine including: a plurality of cylinders, each of which has an intake passage injection valve for injecting fuel into an intake passage, a cylinder injection valve for injecting fuel into a cylinder, and an ignition plug for igniting an air-fuel mixture in a cylinder; and an engine stopping unit to perform an engine stop of the internal combustion engine when a predetermined condition is satisfied in an operating state of the internal combustion engine, the system comprising:

a combustion stroke prediction unit to predict a combustion stroke that a cylinder of said internal combustion engine reaches when said internal combustion engine comes to an engine stopped state by said engine stopping unit;

a preliminary fuel injection unit to inject fuel of a predetermined amount for a compression stroke cylinder from said intake passage injection valve into the intake passage just before said internal combustion engine comes to an engine stopped state, in the compression stroke cylinder in which a combustion stroke predicted by said combustion stroke prediction unit is a compression stroke; and an engine starting unit to perform an engine start of the internal combustion engine in an engine stopped state by, in an expansion stroke cylinder in which a combustion stroke predicted by said combustion stroke prediction unit is an expansions stroke, injecting fuel from said cylinder injection valve and igniting an air-fuel mixture in the cylinder by said ignition plug, and then in said compression stroke cylinder, igniting an air-fuel mixture in the cylinder by said ignition plug.

* * * * *